(12) United States Patent
Nishiyama

(10) Patent No.: US 8,717,228 B2
(45) Date of Patent: May 6, 2014

(54) METHOD AND DEVICE FOR DETECTING TARGET OBJECT, AND RADAR APPARATUS

(75) Inventor: Koji Nishiyama, Nishinomiya (JP)

(73) Assignee: Furuno Electric Company Limited, Nishinomiya (JP)

(*) Notice: Subject to any disclaimer, the term of this patent is extended or adjusted under 35 U.S.C. 154(b) by 411 days.

(21) Appl. No.: 13/277,285

(22) Filed: Oct. 20, 2011

(65) Prior Publication Data

US 2012/0127019 A1 May 24, 2012

(30) Foreign Application Priority Data

Nov. 19, 2010 (JP) .................................. 2010-258436

(51) Int. Cl.
*G01S 7/292* (2006.01)
*G01S 13/524* (2006.01)
*G01S 7/41* (2006.01)
*G01S 7/28* (2006.01)

(52) U.S. Cl.
CPC ........... *G01S 7/2927* (2013.01); *G01S 13/5244* (2013.01); *G01S 7/411* (2013.01); *G01S 7/2806* (2013.01)
USPC .............. 342/93; 342/159; 342/176; 342/197

(58) Field of Classification Search
CPC ....... G01S 13/72; G01S 7/2927; G01S 13/42; G01S 13/5244; G01S 13/726; G01S 13/89; G01S 7/292; G01S 7/411; G01S 7/418; G01S 7/2806
USPC ........ 342/90, 93–97, 159, 162, 176, 195, 197
See application file for complete search history.

(56) References Cited

U.S. PATENT DOCUMENTS

| | | | | | |
|---|---|---|---|---|---|
| 4,057,800 | A | * | 11/1977 | Ganz | 342/116 |
| 4,247,843 | A | * | 1/1981 | Miller et al. | 340/973 |
| 4,550,318 | A | * | 10/1985 | Prengaman et al. | 342/90 |
| 4,845,500 | A | * | 7/1989 | Cornett et al. | 342/90 |
| 5,396,252 | A | * | 3/1995 | Kelly | 342/94 |
| 5,714,937 | A | * | 2/1998 | Campana, Jr. | 340/573.1 |
| 5,870,055 | A | * | 2/1999 | Kim | 342/169 |
| 8,248,296 | B2 | * | 8/2012 | Maeno et al. | 342/96 |
| 8,570,213 | B2 | * | 10/2013 | Nishiyama | 342/179 |
| 2011/0102248 | A1 | * | 5/2011 | Maeno et al. | 342/179 |
| 2011/0169685 | A1 | * | 7/2011 | Nishiyama | 342/179 |

FOREIGN PATENT DOCUMENTS

| | | | |
|---|---|---|---|
| JP | 8-136641 A | | 5/1996 |
| JP | 10-104347 A | | 4/1998 |
| JP | 2001-242246 A | | 9/2001 |
| JP | 2002-243842 A | | 8/2002 |
| JP | 2003-172777 A | | 6/2003 |
| JP | 2010286359 A | * | 12/2010 |
| JP | 2012108049 A | * | 6/2012 |
| JP | 2012108050 A | * | 6/2012 |
| JP | 2012108057 A | * | 6/2012 |
| JP | 2012112671 A | * | 6/2012 |

* cited by examiner

*Primary Examiner* — John B Sotomayor
(74) *Attorney, Agent, or Firm* — Birch, Stewart, Kolasch & Birch, LLP

(57) ABSTRACT

This disclosure provides a method of detecting a target object by receiving reflection echoes of detection signals transmitted sequentially from a revolving antenna, and by detecting a target object based on detection data resulted from sampling reception signals at a predetermined time interval. The method comprises temporarily storing the detection data within a predetermined geographical range, and identifying the type of the reflection echo based on a change between values of the detection data at physically-close locations within the predetermined geographical range.

20 Claims, 19 Drawing Sheets

TRANSITION IN AZIMUTH DIRECTION
( REFERENCE LOCATION (R3, θ3) )
(RAIN CLUTTER)
Cnv (CHANGE COUNT)= "3"

TRANSITION IN AZIMUTH DIRECTION
AT TARGET OBJECT LOCATION
Cnv (CHANGE COUNT)= "0"

TRANSITION IN AZIMUTH DIRECTION
AT LOCATION WITHOUT RAIN CLUTTER
Cnv (CHANGE COUNT)= "0"

Σ[Mv] » 0

Σ[Mv] ≒ 0

Σ[Mv] ≒ 0

Σ[Mv] ≒ 0

Σ[Mv] « 0

METHOD AND DEVICE FOR DETECTING TARGET OBJECT, AND RADAR APPARATUS

CROSS-REFERENCE TO RELATED APPLICATION(S)

The application claims priority under 35 U.S.C. §119 to Japanese Patent Application No. 2010-258436, which was filed on Nov. 19, 2010, the entire disclosure of which is hereby incorporated by reference.

TECHNICAL FIELD

The present invention relates to a method and device for detecting a target object, which transmit detection signals while revolving an antenna and generate display image data of detected target object(s) based on reflection waves of the detection signals. More specifically, the present invention also relates to the method and device for detecting the target object, which suppress influences of highly-random clutter, such as rain clutter. Moreover, the present invention also relates to a radar apparatus equipped with the device.

BACKGROUND OF THE INVENTION

Conventionally, various devices for detecting target object(s) which transmit detection signals, receive reflection waves of the detection signals, and generate display image data of the detected target object(s) based on the reception signals, have been devised. Such target object detection devices have a problem caused by clutter, such as rain clutter. The clutter is such a phenomenon projected on a display screen that an amplitude value (intensity) of the reception signal becomes high except for the reflection waves from the target object(s). The rain clutter is one type of the clutter which is produced by the detection signals reflecting on rain.

Thus, JP2001-242246A, JP2003-172777A, and JP2002-243842A disclose target object detection devices which suppress the rain clutter by the radar apparatus indicated to.

The devices disclosed in JP2001-242246A and JP2003-172777A store a radar image in advance of a situation where it is not raining, compare it with a radar image obtained by the reception signals upon the target object detection to suppress the clutter.

Whereas, the device disclosed in JP2002-243842A suppresses the clutter by performing correlation processing between the current radar image and radar image obtained one antenna revolution before.

However, the conventional devices disclosed in JP2001-242246A, JP2003-172777A, and JP2002-243842A may be difficult to implement because the amount of data stored in advance becomes huge, or may be unable to effectively suppress the rain clutter according to the condition of rain.

SUMMARY OF THE INVENTION

Thus, the present invention is made in view of the above situations, and provides a method, program, and device for detecting target object(s) that can correctly and effectively suppress highly-random clutter, such as rain clutter, and also provides a radar apparatus equipped with the device.

According to one aspect of the present invention, a method of detecting a target object by receiving reflection echoes of detection signals transmitted sequentially from a revolving antenna, and by detecting a target object based on detection data resulted from sampling reception signals at a predetermined time interval, is provided. The method comprises temporarily storing the detection data within a predetermined geographical range, and identifying the type of the reflection echo based on a change between values of the detection data at physically-close locations within the predetermined geographical range.

This method uses the fact that the change between the detection data values at the physically-close location differs depending on whether the type of the reflection echo is a target object, or rain clutter or noise. Here, the change of the detection data may be expressed by the change being from a positive value to a negative value, or vise versa, considering two or more data values within a predetermined geographical range, a sum total value of amounts of the changes of the two or more data values. For example, by setting a predetermined determination criterion for the changes (for example, setting a threshold), the type of the reflection echo can be identified.

In one embodiment, the step of identifying the type of the reflection echo may comprise counting the number of times of the change in the detection data values within the predetermined geographical range that is set with respect to the detection data corresponding to an image location to be set. The change may be from a positive value to a negative value or from a negative value to a positive value. The step of identifying the type of the reflection echo may also comprise determining that the type of the reflection echo corresponding to the image location to be set is rain clutter or noise if the counted value is above a first identifying threshold.

In one embodiment, the step of identifying the type of the reflection echo may comprise calculating a total amount of the change by adding amounts of the changes in the detection data value within the predetermined geographical range, and determining that the type of the reflection echo corresponding to the image location to be set is rain clutter or noise if the total amount of the change is below a second identifying threshold.

These two methods describe particular echo identifications. The former method uses the number of times of the change in the detection data value from a positive value to a negative value, of from a negative value to a positive value, and the latter method uses the total change amount by adding the amounts of the changes in the detection data value within the predetermined geographical range.

In one embodiment, the method may further comprise generating mask image data for suppressing the rain clutter or the noise based on the determination of the type of the reflection echo, and generating display image data using the detection data and the mask image data.

This method generates the display image data for target object detection, from which rain clutter and noise are suppressed based on the echo identification result described above.

According to another aspect of the present invention, a method of detecting a target object by receiving reflection echoes of detection signals transmitted sequentially from a revolving antenna and by generating display image data of detected target object based on detection data resulted from sampling reception signals at a predetermined time interval is provided. The method comprises temporarily storing the detection data within a predetermined geographical range, generating mask image data based on a change between values of the detection data at physically-close locations within a predetermined geographical range, and generating the display image data using the detection data and the mask image data.

The method uses the fact that the changes in the detection data value between the physically-close locations differ for highly-random clutter, such as rain clutter, and the target object. Here, the change of the detection data may be expressed by the change being from a positive value to a negative value, or vise versa, considering two or more data values within a predetermined geographical range, or a sum total value of amounts of the changes of the two or more data values. This method adjusts the mask image data value according to such a difference. By using the adjusted mask image data, the detection data can be corrected, thereby suppressing the highly-random clutter, such as rain clutter.

In one embodiment, the step of generating mask image data may comprise counting the number of times of the change in the detection data value within the predetermined geographical range. The change may be from a positive value to a negative value or from a negative value to a positive value. The step of generating mask image data may also comprise setting a value of the mask image data to a predetermined mask image value if the counted value is above a threshold. The step of generating display image data may comprise subtracting the mask image data value from the detection data value.

This method describes particular changes between the positive value and the negative value of the two or more detection data values within the predetermined geographical range.

In one embodiment, the step of generating mask image data may comprise calculating a total amount of the change by adding amounts of the changes in the detection data value within the predetermined geographical range, setting an original data value of the mask image data, according to the total amount of the change, and setting a new value of the mask image data by subtracting the original data value from a maximum settable value of the mask image data value. The step of generating display image data may comprise subtracting the mask image data value from the detection data value.

This method describes a particular case where the sum total value of the amounts of the changes of two or more detection data values within the predetermined geographical range is used.

In one embodiment, the step of generating mask image data may comprise calculating a value as a correction value, obtained by dividing the detection data value by the maximum settable value, and setting a value obtained by multiplying the total change amount by the correction value to the original data value.

This method describes a more particular processing method when using the sum total value of amounts of the changes of the above detection data value.

In one embodiment, the step of generating mask image data may comprise smoothing a distribution of the original data value.

This method describes a case where the smoothing is incorporated as one of the more particular processing methods. Thereby, the discontinuity in the boundary between an area where the value of the mask image data set for the suppression is high and an area where the value which is not suppressed is low can be reduced.

According to another aspect of the present invention, a device for detecting a target object by receiving reflection echoes of detection signals transmitted sequentially from a revolving antenna, and by detecting a target object based on detection data resulted from sampling reception signals at a predetermined time interval is provided. The device comprises a temporarily storage module for temporarily storing the detection data within a predetermined geographical range, and an echo identification module for identifying the type of the reflection echo based on a change between values of the detection data at physically-close locations within the predetermined geographical range.

This device uses the fact that the change between the detection data values at the physically-close location differs depending on whether the type of the reflection echo is a target object, or rain clutter or noise. Here, the change of the detection data may be expressed by the change being from a positive value to a negative value, or vise versa, considering two or more data values within a predetermined geographical range, a sum total value of amounts of the changes of the two or more data values. For example, by setting a predetermined determination criterion for the changes (for example, setting a threshold), the type of the reflection echo can be identified.

In one embodiment, the echo identification module for identifying the type of the reflection echo may count the number of times of the change in the detection data value within the predetermined geographical range that is set with respect to the detection data corresponding to an image location to be set. The change may be from a positive value to a negative value or from a negative value to a positive value. The echo identification module for identifying the type of the reflection echo may also determine that the type of the reflection echo corresponding to the image location to be set is rain clutter or noise if the counted value is above a first identifying threshold.

In one embodiment, the echo identification module for identifying the type of the reflection echo may calculate a total amount of the change by adding amounts of the changes in the detection data value within the predetermined geographical range, and may determine that the type of the reflection echo corresponding to the image location to be set is rain clutter or noise if the total amount of the change is below a second identifying threshold.

These two modules describe particular echo identifications. The former module uses the number of times of the change in the detection data value from a positive value to a negative value, of from a negative value to a positive value, and the latter module uses the total change amount by adding the amounts of the changes in the detection data value within the predetermined geographical range.

In one embodiment, the device for detecting a target object may further comprise a mask image generation module for generating mask image data for suppressing the rain clutter or the noise based on the determination of the type of the reflection echo, and a display image data generation module for generating display image data using the detection data and the mask image data.

With this configuration, the device generates the display image data for target object detection, from which rain clutter and noise are suppressed based on the echo identification result described above.

According to another aspect of the present invention, a device for detecting a target object by receiving reflection echoes of detection signals transmitted sequentially from a revolving antenna and by generating display image data of detected target object based on detection data resulted from sampling reception signals at a predetermined time interval is provided. The device comprises a temporarily storage module for temporarily storing the detection data within a predetermined geographical range, a mask image data generation module for generating mask image data based on a change between values of the detection data at physically-close locations within a predetermined geographical range, and a display image data generation module for generating the display image data using the detection data and the mask image data.

The device uses the fact that the changes in the detection data value between the physically-close locations differ for highly-random clutter, such as rain clutter, and the target object. Here, the change of the detection data may be expressed by the change being from a positive value to a negative value, or vise versa, considering two or more data values within a predetermined geographical range, or a sum total value of amounts of the changes of the two or more data values. This device adjusts the mask image data value according to such a difference. By using the adjusted mask image data, the detection data can be corrected, thereby suppressing the highly-random clutter, such as rain clutter.

In one embodiment, the mask image data generation module may count the number of times of the change in the detection data value within the predetermined geographical range. The change may be from a positive value to a negative value or from a negative value to a positive value. The mask image data generation module may also set a value of the mask image data to a predetermined mask image value if the counted value is above a threshold. The display image data generation module may subtract the mask image data value from the detection data value.

With this configuration, particular changes between the positive value and the negative value of the two or more detection data values within the predetermined geographical range are shown.

In one embodiment, the mask image data generation module may calculate a total amount of the change by adding amounts of the changes in the detection data value within the predetermined geographical range. The mask image data generation module may also set an original data value of the mask image data, according to the total amount of the change, and may set a new value of the mask image data by subtracting the original data value from a maximum settable value of the mask image data value. The display image data generation module may subtract the mask image data value from the detection data value.

With this configuration, a particular case where the sum total value of the amounts of the changes of two or more detection data values within the predetermined geographical range is used.

According to another aspect of the present invention, a radar apparatus is provided, which includes any one of the detection devices described above, where electromagnetic waves at a predetermined frequency are used as the detection signals.

According to the above aspects of the present invention, highly-random clutter, such as rain clutter, can be suppressed more accurately and more effectively rather than the conventional method, thereby the target object can be clearly displayed.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, several embodiments of the present invention will be described with reference to the accompanying drawings.

First Embodiment

In one embodiment, a method of detecting a target object and a target object detection device will be described. In this embodiment, a radar apparatus is used as the target object detection device, and it transmits an electromagnetic wave at a predetermined frequency and performs a target object detection based on a reflection wave. Moreover, in this embodiment, the radar apparatus uses a method of suppressing rain clutter, and this method is particularly described.

Figure 1:
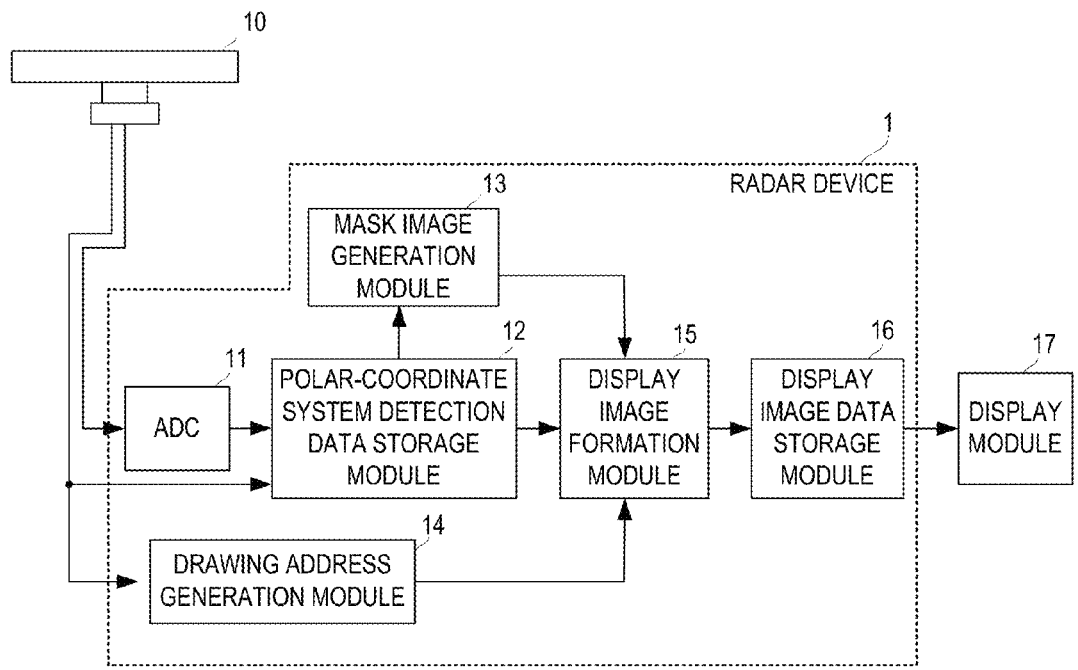
FIG. 1 is a block diagram showing a configuration of a radar apparatus according to one embodiment of the present invention.

FIG. 1 is a block diagram showing a configuration of the radar apparatus. As shown in FIG. 1, the radar apparatus 1 includes an AC-DC converter 11, a polar coordinate system detection data storage module 12, a mask image generation module 13, a drawing address generation module 14, a display image formation module 15, and a display image data storage module 16. Note that, although the radar apparatus 1 includes a detection signal generation module for generating a pulse-shaped detection signal which is modulated at a predetermined frequency, an illustration thereof is omitted in this drawing.

The radar apparatus 1 is connected with an antenna 10. The detection signal generated by the detection signal generation module is supplied to the antenna 10. The antenna 10 transmits (emits) the detection signal to the exterior as an electromagnetic wave, while revolving in a horizontal plane at a predetermined revolving speed. Here, the antenna 10 transmits the detection signal with a predetermined directivity.

The antenna 10 receives a reflection wave of the detection signal, and outputs the reception signal to the AD converter 11. Moreover, the antenna 10 sequentially outputs information of a revolving angle of the antenna to the drawing address generation module 14.

The AD converter 11 samples the reception signal at a predetermined sampling time interval, and generates the detection data. Here, the AD converter 11 generates the detection data for every reception signal corresponding to one transmission of the detection signal (i.e., for every sweep). Moreover, the AD converter 11 acquires an amplitude value (detection data value) of the detection data which is converted into a discrete value of a predetermined tone (for example, 0-255). The AD converter 11 outputs the detection data per sweep to the polar coordinate system detection data storage module 12. Hereinafter, the detection data value is simply referred to as "the detection data" unless otherwise particularly described in below as needed.

The polar coordinate system detection data storage module 12 has a capacity capable of storing the detection data obtained by one revolution of the antenna 10 (i.e., for one scan). The polar coordinate system detection data storage module 12 sequentially stores the detection data inputted from the AD converter 11. Thereby, the polar coordinate system detection data storage module 12 stores the detection data which are arranged two-dimensionally in a distance direction originating from the location of the antenna 10 (R-direction) as well as in an azimuth (circumferential) direction corresponding to the revolving direction of the antenna 10 (θ-direction).

Although a particular method will be described later, the mask image generation module 13 generates the mask image data based on a state of change in the detection data value. In this embodiment, the state of change in the detection data value is expressed by a change count Cnv which is a sum total value of the number of times by which the detection data value changes from a positive value to a negative value or from a negative value to a positive value.

The display image formation module 15 reads out the detection data from the polar coordinate system detection data storage module 12, subtracts a mask image data value from the detection data value to generate display image data. The display image formation module 15 writes the display image data, which is stored in the form of the polar coordinate system, in the display image data storage module 16 which stores the data in an rectangular coordinate system, according to a write-in address for converting the polar coordinate system acquired from the drawing address generation module 14 into the rectangular coordinate system.

The display image data storage module 16 has a capacity to store a predetermined geographical range of the display image data including the entire detection area. Addresses of the display image data storage module 16 are given in the rectangular coordinate system. The display image data written in the display image data storage module 16 is read out by a display module 17.

The display module 17 illuminates a display panel, such as a liquid crystal display, at brightness and colors according to the read display image data values. Thereby, an operator can visually observe detected target object images based on the detection signals.

Figure 2:
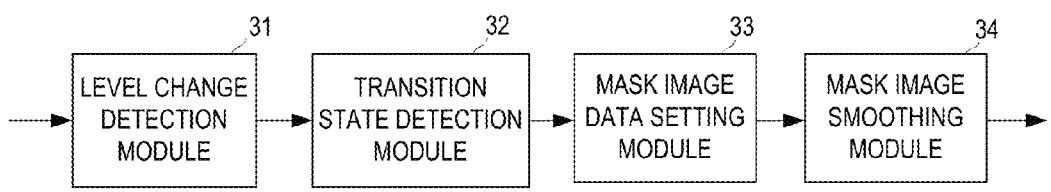
FIG. 2 is a block diagram showing a configuration of a mask image generation module according to the first embodiment of the present invention.
Figure 3A:
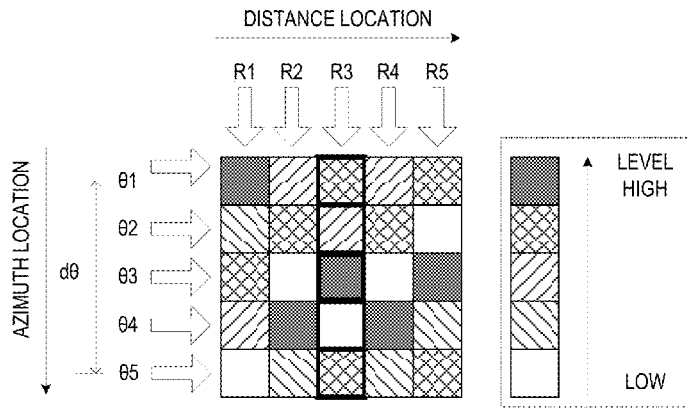
FIGS. 3A to 3D are views illustrating the concept of a mask image generation by the mask image generation module.
Figure 3B:
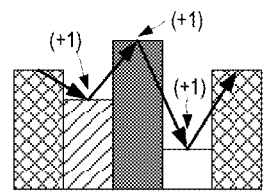
Figure 3C:
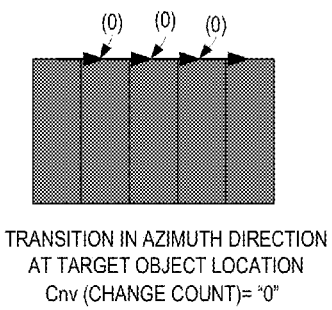

Next, a particular configuration and processing of the mask image generation module 13 are described in detail. FIG. 2 is a block diagram showing the configuration of the mask image generation module 13. FIGS. 3A to 3D are views illustrating the concept of a mask image generation by the mask image generation module 13. FIG. 3A is a view showing an example distribution of the detection data value within a certain polar-coordinate area. FIG. 3B is a view showing the concept of calculation of a change count Cnv, and it shows a state of change in the detection data value within a rain clutter area. FIG. 3C is a view showing a state of change in the detection data value within an area without the areas of the target objects and the rain clutter.

The mask image generation module 13 includes a level change detection module 31, a transition state detection module 32, a mask image data setting module 33, and a mask image smoothing module 34.

The level change detection module 31 detects a level change between the detection data at two polar-coordinate locations. The level change is a difference of the two detection data values. Here, the level change detection module 31 sequentially detects the level change between the two detection data in the same direction.

For example, in the situation of FIG. 3A, when calculating the level change of the detection data which are arranged at azimuth locations θ1-θ5 and the distance location R3, the level change is sequentially calculated as follows:

First, a level change from detection data at a polar-coordinate location (R3, θ1) to detection data at a polar-coordinate location (R3, θ2) is detected. Since the detection data value is decreased between these detection data as shown in FIGS. 3A and 3B, a level change (negative value) is detected.

Then, a level change from the detection data at a polar-coordinate location (R3, θ2) to detection data at a polar-coordinate location (R3, θ3) is detected. Since the detection data value is increased between these detection data as shown in FIGS. 3A and 3B, a level change (positive value) is detected.

Then, a level change from the detection data at a polar-coordinate location (R3, θ3) to detection data at a polar-coordinate location (R3, θ4) is detected. Since the detection data value is decreased between these detection data as shown in FIGS. 3A and 3B, a level change (negative value) is detected.

Then, a level change from the detection data at a polar-coordinate location (R3, θ4) to detection data at a polar-coordinate location (R3, θ5) is detected. Since the detection data value is increased between these detection data as shown in FIGS. 3A and 3B, a level change (positive value) is detected.

Note that, although the level changes are detected sequentially from the azimuth locations θ1, θ2, θ3, θ4 and θ5 along the revolving direction in this embodiment, the level changes may be detected along the opposite revolving direction.

The transition state detection module 32 calculates the change count Cnv based on the level change within a predetermined geographical range with respect to an observing polar-coordinate location. Specifically, the transition state detection module 32 calculates the change count Cnv by counting the number of changes between adjacent levels from a positive value to a negative value, or from a negative value to a positive value.

For example, the case of FIGS. 3A and 3B is shown, where the change count Cnv at the polar-coordinate location (R3, θ3) is calculated. In this embodiment, a range of the azimuth locations θ1-θ5 centering on the azimuth location θ3 is set to a predetermined area dθ.

The level change becomes a negative value from the polar-coordinate location (R3, θ1) to the polar-coordinate location (R3, θ2), whereas the level change becomes a positive value from the polar-coordinate location (R3, θ2) to the adjacent polar-coordinate location (R3, θ3). Therefore, the change count Cnv is added with "+1."

The level change becomes a positive value from the polar-coordinate location (R3, θ2) to the polar-coordinate location (R3, θ3), whereas the level change becomes a negative value from the polar-coordinate location (R3, θ3) to the adjacent polar-coordinate location (R3, θ4). Therefore, the change count Cnv is further added with "+1" and becomes "+2."

The level change becomes a negative value from the polar-coordinate location (R3, θ3) to the polar-coordinate location (R3, θ4), whereas the level change becomes a positive value from the (R3, θ4) to the adjacent polar-coordinate location (R3, θ5). Therefore, the change count Cnv is further added with "+1" and becomes "+3."

Therefore, using the configuration and processing of this embodiment, the change count Cnv at the polar-coordinate location (R3, θ3) is set to "+3."

Figure 3D:
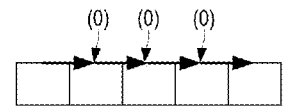

Thus, within the rain clutter area, the change count Cnv is added sequentially, and the value becomes larger. On the other hand, as shown in FIG. 3C, the detection data value of the target object is always high. Therefore, the change count Cnv becomes substantially "0" ("0" in FIG. 3C). Similarly, if there is neither a target object nor rain clutter as shown in FIG. 3D, the detection data value is always substantially "0." Therefore, the change count Cnv is also substantially "0" ("0" in FIG. 3D).

Thus, by calculating the change count Cnv, the area with highly-random clutter such as rain clutter, and an area without a target object and clutter can be discriminated.

The transition state detection module 32 outputs the change count Cnv calculated corresponding to the polar-coordinate location to the mask image data setting module 33.

Note that, although this embodiment shows the example where the change in the detection data value arranged in the azimuth direction is detected, the change count Cnv may be calculated by detecting the change in the detection data value arranged in the distance direction. However, as shown in this embodiment, if it is a case where the change between the adjacent detection data values is detected, it may be better to calculate the change in the large detection data values arranged in the azimuth direction along which the acquisition timing difference between the detection data is large. This is because since the acquisition timing difference is shorter between the detection data arranged in the distance direction, a sufficient difference between the detection data values may not be produced even for the highly-random clutter such as rain clutter. Therefore, by detecting the change between the detection data values arranged in the azimuth direction, the change in the detection data value due to the highly-random clutter such as rain clutter can be more securely detected.

Moreover, in this embodiment, the detection data which are adjacent in the azimuth direction (i.e., the detection data on adjacent sweeps) are used as a reference to detect the change in the detection data value. However, the change in the data value may be detected between the neighboring detection data (e.g., the detection data on the sweeps which interpose one to three sweeps therebetween). More specifically, in the case shown in FIGS. 3A to 3D, the level change may be detected based on a difference between the detection data value at the polar-coordinate location (R3, θ1) and the detection data value at the polar-coordinate location (R3, θ5), for example.

Moreover, such an interval between the detection data may be changed according to the distance location.

Note that, the level change may also be calculated based on the separated azimuth locations, similar to the level change between the detection data arranged in the distance direction.

The mask image data setting module 33 sets a mask image data value by comparing the change count Cnv with a predetermined threshold Th. Note that the threshold Th is a value set in advance by an experiment according to a difference between the change counts Cnv when rain clutter exists and does not exist. Moreover, the threshold Th is set suitably according to a width of the range for calculating the change count Cnv.

Specifically, when the change count Cnv corresponding to the polar-coordinate location where the mask image data value is to be set is above the threshold Th, the mask image data setting module 33 sets the mask image data value at the polar-coordinate location to a maximum settable value. For example, if the mask image data contains 256 tones ranging 0-255, the maximum value of 255 is set.

On the other hand, when the change count Cnv corresponding to the polar-coordinate location where the mask image data value is to be set is below the threshold Th, the mask image data setting module 33 sets the mask image data value at the polar-coordinate location as a minimum settable value. For example, if the mask image data contains 256 tones ranging 0-255, the minimum value of 0 is set. Note that, the setting to the maximum and minimum values is merely an example, and the data value may be set to any other suitable values. For example, the data value may be a certain high value such as about 250 (a value near the maximum value), instead of the maximum value. Moreover, the data value may be a certain low value such as about 10 (a value near the minimum value), instead of the minimum value.

Figure 4A:
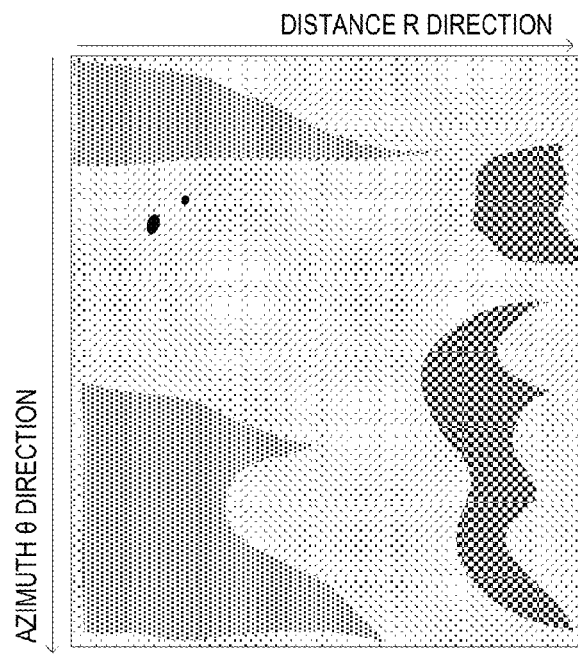
FIGS. 4A and 4B are a view showing a distribution of a mask image data value in a certain scan and a view showing a distribution of a detection data value, respectively.
Figure 4B:
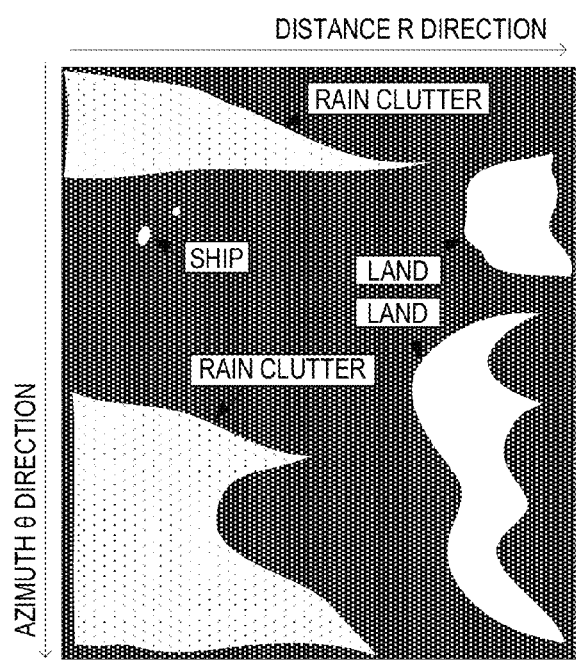

By performing such processing, the mask image data as shown in FIGS. 4A and 4B can be obtained. FIG. 4A is a view showing a distribution of the mask image data value in a certain scan, where the lightest color (close to white) corresponds to the maximum value and the darkest color (close to black) corresponds to the minimum value. FIG. 4B is a view showing a distribution of the detection data value for the same scan as FIG. 4A, where the light color (white) indicates a high level and the dark color indicates a low level. As shown in FIGS. 4A and 4B, by using processing of this embodiment, the mask image data with a higher value is set to the generated area of rain clutter, and the mask image data with a lower value is set to the area of land or a target object.

The mask image data setting module 33 outputs the mask image data set in this way to the mask image smoothing module 34.

The mask image smoothing module 34 performs, for example, shading-off processing to the mask image data. The shading-off processing includes gauss shading-off processing of a predetermined radius (lengths in the distance direction and the azimuth direction), and linear interpolation processing. This cancels the discontinuity of the mask image data values between the polar-coordinate location set to the maximum value and the polar-coordinate location set to the minimum value.

Figure 5:
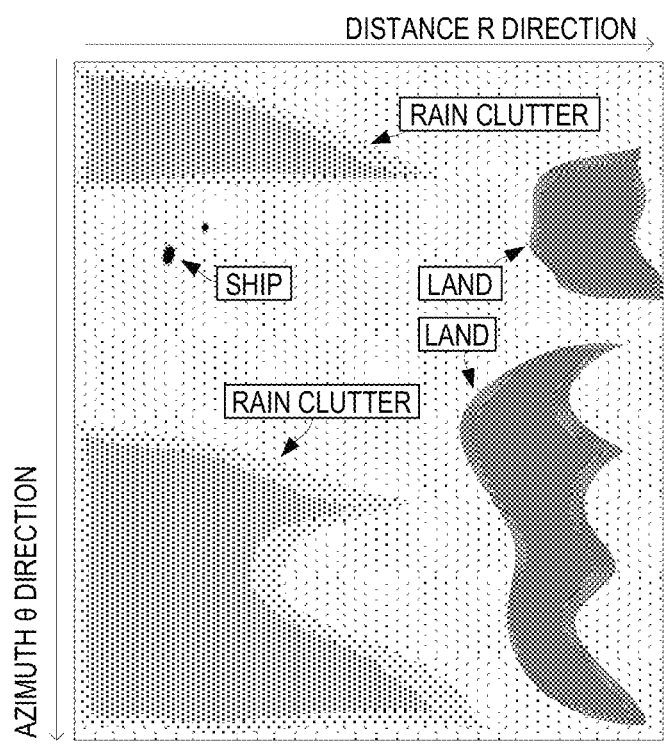
FIG. 5 is a view showing a distribution of the mask image data value after smoothing.

FIG. 5 is a view showing a distribution of the mask image data value after smoothing. As is clear from FIG. 5, the mask image data of which the value changes smoothly can be generated by the smoothing.

The smoothed mask image data which is generated in this way is outputted to the display image formation module 15 according to a reading control from the display image formation module 15.

Here, the mask image generation module 13 includes a storage module for storing the mask image data for one scan, and the storage module stores the mask image data after the smoothing. Then, the mask image generation module 13 outputs the stored mask image data according to the reading control from the display image formation module 15.

As described above, the display image formation module 15 reads out the detection data and the mask image data which are located at a mutually corresponding location. The display image formation module 15 generates the display image data by subtracting the mask image data value from the detection data value. That is, from the detection data value at each location of FIG. 4B, the mask image data value at the same location in FIG. 5 is subtracted.

Figure 6:
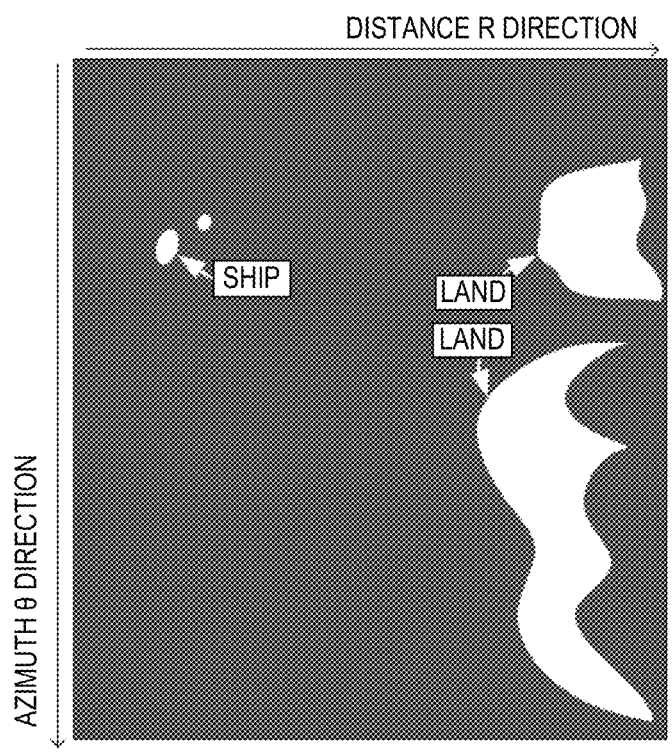
FIG. 6 shows a distribution of a display image data value at the timings of FIGS. 4 and 5.

As a result of such processing, since the mask image data value is high in the rain clutter area and the value is low in the area without a target object or rain clutter, the detection data value is suppressed in the rain clutter area, and the detection data value is not suppressed within the area without a target object or rain clutter. Therefore, as shown in FIG. 6, the display image data where the value remains high in the area with a target object or land and the value is suppressed within the rain clutter area can be generated. FIG. 6 shows a distribution of the display image data value at the timing of FIGS. 4 and 5.

Figure 7A:
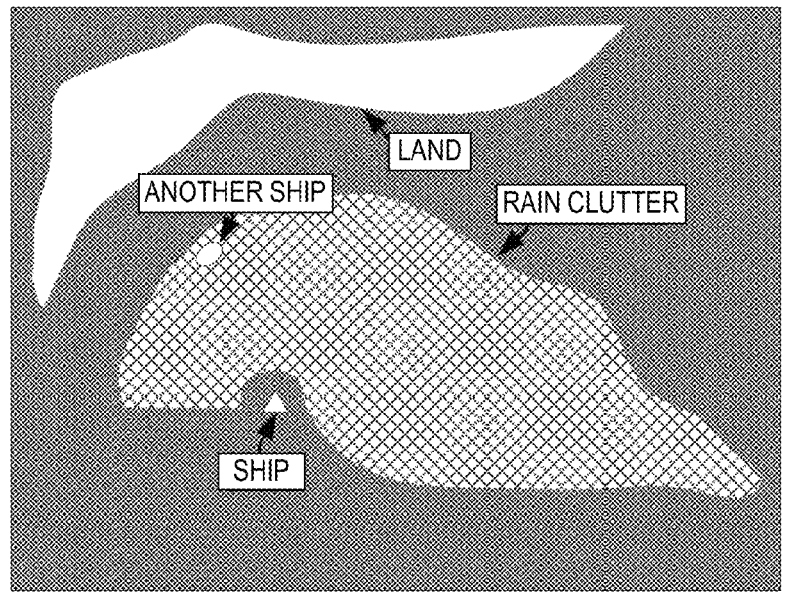
FIGS. 7A and 7B show, according to the first embodiment of the present invention, a display image in a rectangular coordinate system using the detection data as they are, and a view showing a display image in the rectangular coordinate system after performing the suppression process, respectively.
Figure 7B:
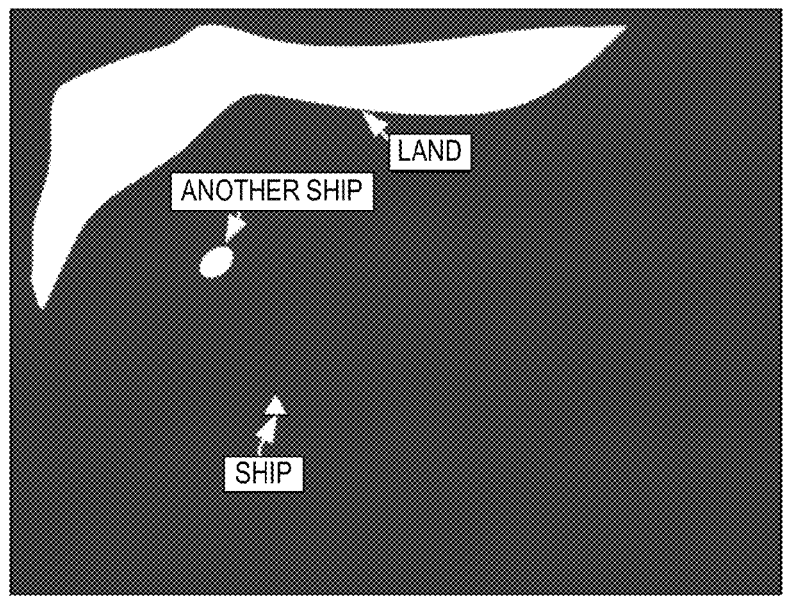

FIG. 7A shows a display image in the rectangular coordinate system where the detection data are used as they are, and FIG. 7B shows a display image in the rectangular coordinate system when a suppression of this embodiment is performed. As is also seen from FIGS. 7A and 7B, by using the configuration and processing of this embodiment, the operator can be provided with the image from which the rain clutter is suppressed, while leaving ship and land.

Figure 8:
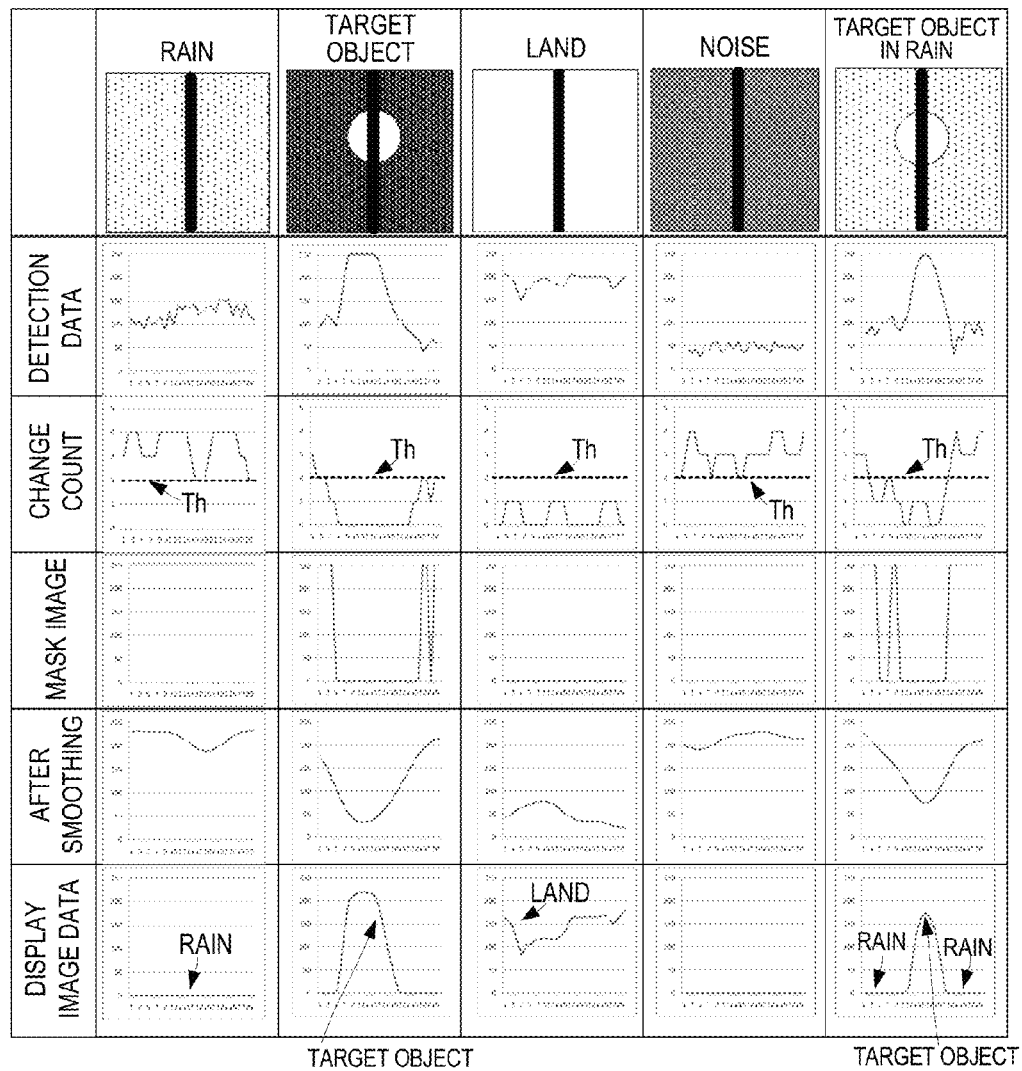
FIG. 8 shows views of transitions of the data values in respective processing of this embodiment, for rain clutter area, target object (ship), land, noise, and target object (ship) within a rain clutter area situations.

More specifically, FIG. 8 shows a data level transition at each process of the processing of this embodiment, for each of the rain clutter area, target object (ship), land, noise, and target object (ship) within the rain clutter area situations. Note that, each situation shows a processing result at each polar-coordinate location along a thick line drawn in the image data of FIG. 8.

As shown in FIG. 8, the display image data value is suppressed within the rain clutter area and the noise area. The display image data value is maintained high within the area with a target object (ship) and land. In the case where a target object (ship) exists within the rain clutter area, the display image data value corresponding to the rain clutter area is suppressed, while the display image data value corresponding to the target object (ship) is maintained high.

Thus, by using the configuration and processing of this embodiment, the target object and land can be displayed with high values, while suppressing the highly-random clutter, such as rain clutter.

Figure 9:
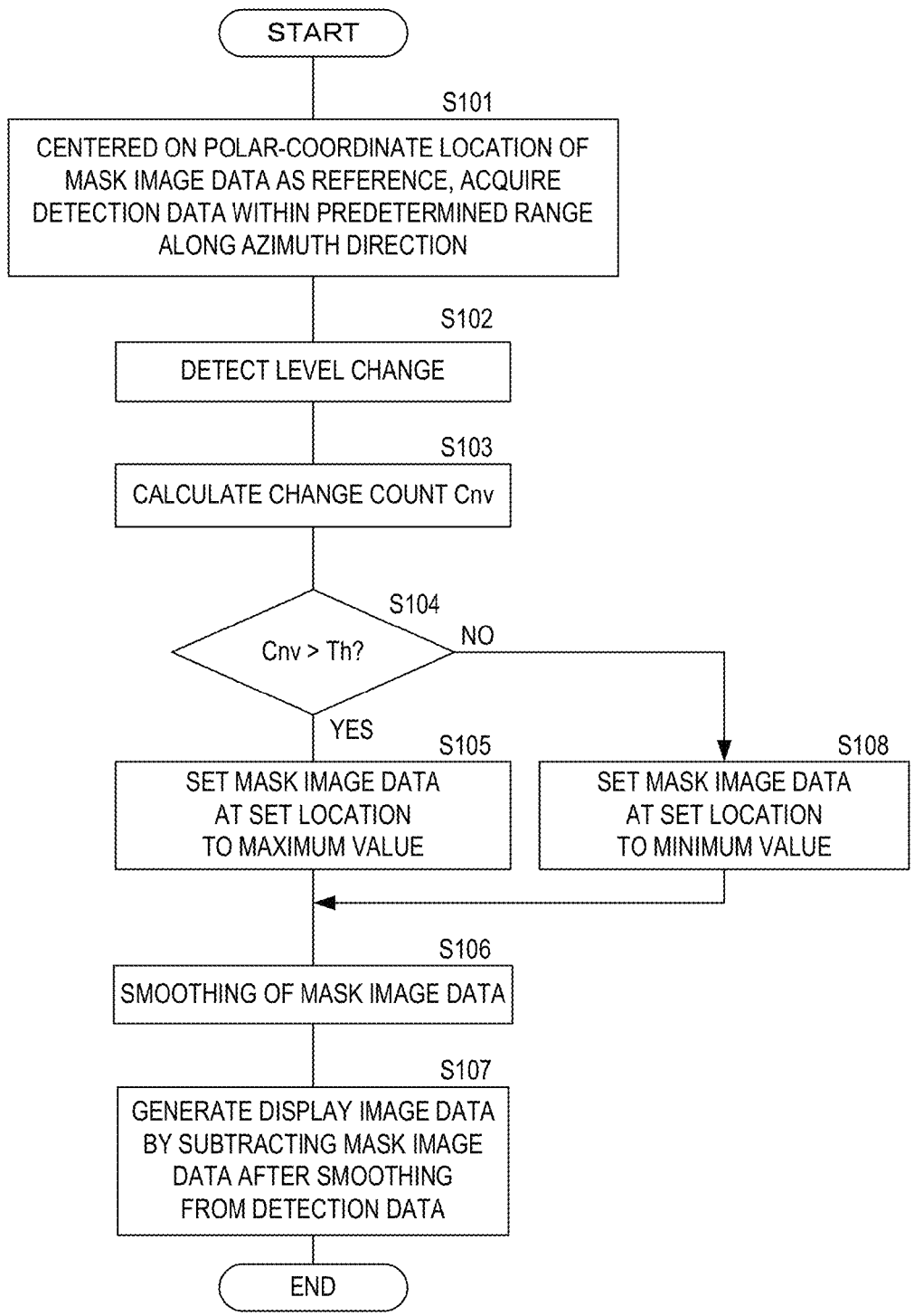
FIG. 9 is a flowchart showing suppression of the rain clutter according to this embodiment.

Note that, although the case where the entire processing is performed divided into respective functional blocks, the processes after the detection data acquisition may be programmed and stored in a storage medium, and the program may be performed by reading out by an operating device, such as a CPU. In this case, the following process flow may be executed. Here, since the details of each processing are described above, primary processing of this process flow is described. FIG. 9 is a flowchart showing the suppression of rain clutter.

First, centered on the set polar-coordinate location of the mask image data, the detection data values within the predetermined geographical range ($d\theta$, according to the above explanation) along the azimuth direction are acquired (S101). S101 corresponds to "temporary storing" in the claims.

Next, a difference between the detection data values which are adjacent in the azimuth direction is calculated to detect any one of the level change with a positive value, the level change with a negative value, or no level change (S102). Here, all the level change is detected along a given direction.

Next, it is determined whether the change between the adjacent levels occurs, and if the change occurs, the change count Cnv is added with "+1." Then, such processing is performed over the entire predetermined geographical range to calculate the change count Cnv in the set polar-coordinate location (S103).

Next, the change count Cnv is compared with threshold Th. If the change count Cnv is above the threshold Th (S104: Yes), the mask image data value at the set polar-coordinate location is set to the maximum value (S105). On the other hand, if the change count Cnv is below the threshold Th (S104: No), the mask image data value at the set polar-coordinate location is set to the minimum value (S108). The entire mask image data is generated by performing such processing to all the polar-coordinate locations for one scan.

Next, the smoothing (e.g., the shading-off processing) of the generated mask image data are performed (S106). The processing from S102 to S106 corresponds to the "generating mask image data" in the claims.

Next, the mask image data value after the smoothing is subtracted (calculate the difference) from the detection data value for every polar-coordinate location to generate the display image data (S107). The processing of S107 corresponds to "generating display image data" in the claims.

By performing such processing, the highly-random clutter, such as rain clutter, which is not to be displayed, can be effectively suppressed as described above. In addition, the target object to be displayed, such as land and ship, can be displayed without being suppressed.

Second Embodiment

Figure 10:
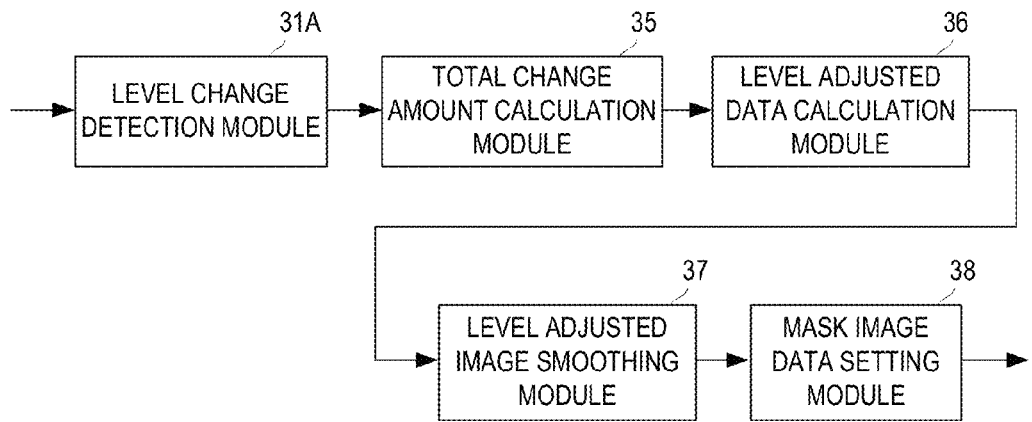
FIG. 10 is a block diagram showing a configuration of a mask image generation module according to the second embodiment of the present invention.

Next, a radar apparatus according to a second embodiment is described with reference to the accompanying drawings. The radar apparatus of this embodiment differs in the configuration and processing of the mask image generation module 13 from the previous embodiment and, thus, other configurations and processing are the same. Therefore, below, only the configuration and processing of the mask image generation module 13 are described in detail. FIG. 10 is a block diagram showing a configuration of the mask image generation module 13 of this embodiment.

Figure 11:
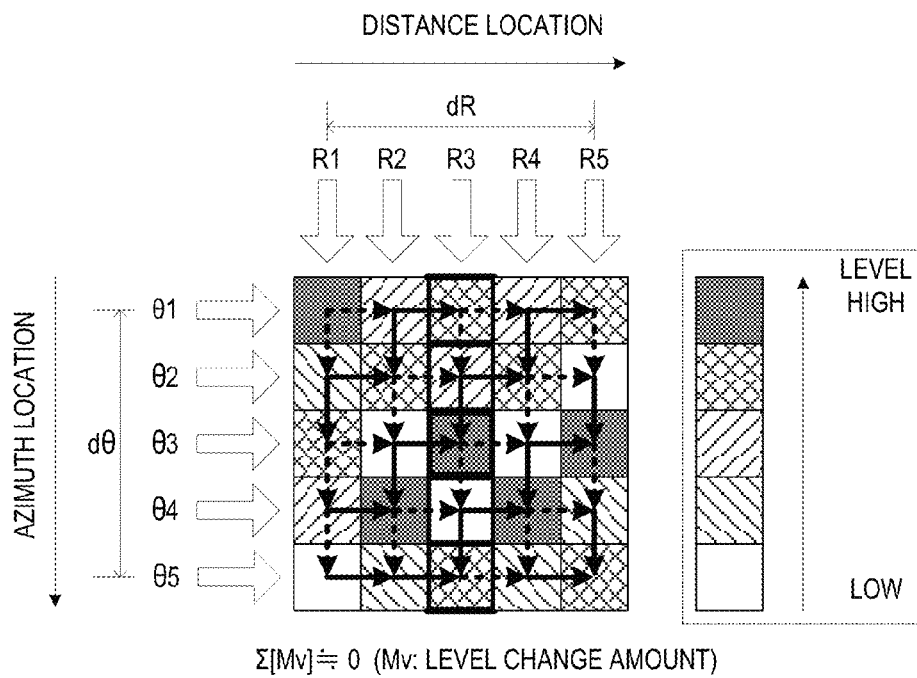
FIG. 11 is a view illustrating the concept of a mask image generation (the rain clutter area) of the mask image generation module.
Figure 12A:
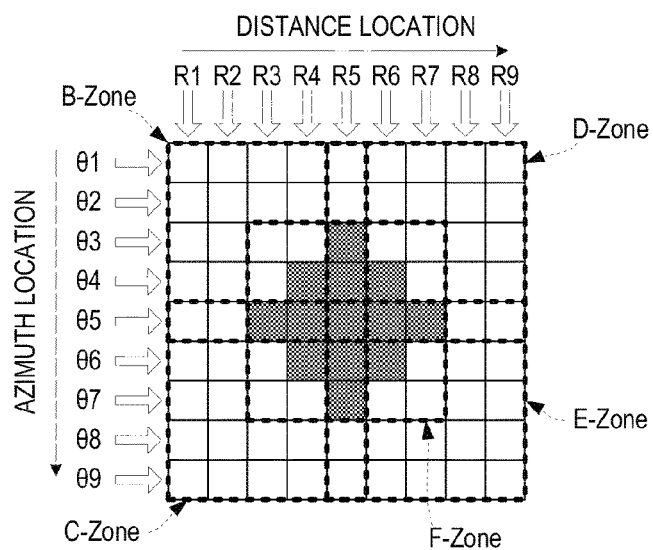
FIGS. 12A to 12F are views illustrating the concept of a mask image generation (area where a target object exists) of the mask image generation module.

FIG. 11 and FIGS. 12A to 12F are views illustrating the concept of a mask image generation of the mask image generation module 13. FIG. 11 shows a rain clutter area, and FIGS. 12A to 12F show an area where a target object exists. FIG. 12A shows a distribution of the detection data value of a large area containing the target object ((distance direction)× (azimuth direction)=9×9). FIGS. 12B, 12C, 12D, 12E, and 12F show a change state of the detection data value of B-Zone, C-Zone, D-Zone, E-Zone, and F-Zone of FIG. 12A, respectively.

In this embodiment, the mask image generation module 13 includes a level change detection module 31A, a total change amount calculation module 35, a level adjusted data calculation module 36, a level adjusted image smoothing module 37, and a mask image data setting module 38.

The level change detection module 31A calculates a level change amount Mv which is a difference between the detection data values at two polar-coordinate locations. Here, the level change detection module 31A detects the level change amount between two detection data sequentially along the same direction.

Specifically, for example, in the situation of FIG. 11, when calculating the level change amounts Mv of the detection data arranged two-dimensionally in an area dR of the distance locations R1-R5 and an area dθ of the azimuth locations θ1-θ5, the level change is sequentially calculated as follows.

In the distance direction, differences of the detection data values are calculated from a rotation center side of the antenna 10 to a distant side. For example, in a distance direction of the azimuth location θ1, the detection data value at the polar-coordinate location (R2, θ1) is subtracted from the detection data value at the polar-coordinate location (R1, θ1) to calculate the level change amount Mv. The detection data value at the polar-coordinate location (R3, θ1) is subtracted from the detection data value at the polar-coordinate location (R2, θ1) to calculate the level change amount Mv. The detection data value at the polar-coordinate location (R4, θ1) is subtracted from the detection data value at the polar-coordinate location (R3, θ1) to calculate the level change amount Mv. The detection data value at the polar-coordinate location (R5, θ1) is subtracted from the detection data value at the polar-coordinate location (R4, θ1) to calculate the level change amount Mv. This processing is performed at every azimuth location θ.

In the azimuth direction, differences between two detection data values are calculated along the revolving direction of the antenna 10. For example, in the azimuth direction of the distance location R1, the detection data value at the polar-coordinate location (R1, θ2) is subtracted from the detection data value at the polar-coordinate location (R1, θ1) to calculate the level change amount Mv. The detection data value at the polar-coordinate location (R1, θ3) is subtracted from the detection data value at the polar-coordinate location (R1, θ2) to calculate the level change amount Mv. The detection data value at the polar-coordinate location (R1, θ4) is subtracted from the detection data value at the polar-coordinate location (R1, θ3) to calculate the level change amount Mv. The detection data value at the polar-coordinate location (R1, θ5) is subtracted from the detection data value at the polar-coordinate location (R1, θ4) to calculate the level change amount Mv. This processing is performed at every distance location R.

In this embodiment, the level change amount Mv is detected sequentially along the direction from R1 to R5 (in the direction going away from the antenna 10), but the level change may be detected along the opposite direction (i.e., a direction approaching the antenna 10). Moreover, the level change is detected sequentially along the revolving direction, at the azimuth locations θ1, θ2, θ3, θ4, and θ5, respectively, in this order, but the level change may be detected along the opposite direction.

The level change detection module 31A outputs the calculated level change amount Mv to the total change amount calculation module 35.

The total change amount calculation module 35 calculates a total change amount ΣMv by integrating the level change amounts Mv within the predetermined geographical range with respect to the observing polar-coordinate location.

For example, a case where the total change amount ΣMv at the polar-coordinate location (R3, θ3) is calculated in the case of FIG. 11 is described below. In this embodiment, a two-dimensional area of the polar coordinate system having a range (dR) of the distance locations R1-R5 centering on the distance location R3 and a range (dθ) of the azimuth locations θ1-θ5 centering on the azimuth location θ3 is set to the predetermined geographical range.

As shown in FIG. 11, in the case of rain clutter, even if the distance direction or the azimuth direction are taken, a change in the adjacent detection data value (the level change) is large, and the numbers of times of the level change amount becoming a positive value and a negative value are substantially the same. Thus, the integrated value of the level change amounts having the positive values and the integrated value of the level change amounts having the negative values are substantially the same. Therefore, the total change amount ΣMv becomes substantially 0.

Figure 12B:
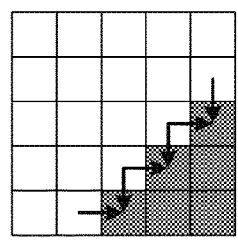

On the other hand, within the area where a target object exists, the number of the level change amounts with high positive values increases along a boundary between the area without a target object and the area where a target object exists in the B-Zone where the direction for calculating the level change amounts Mv shown in FIG. 12B (i.e., the direction from the detection data to be subtracted to the subtracting detection data) is in agreement with the direction from the area without a target object to the area where a target object exists. The level change amount becomes substantially 0, except for the portion along the boundary. Therefore, the total change amount ΣMv becomes a high positive value.

Figure 12D:
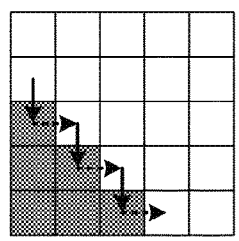
Figure 12F:
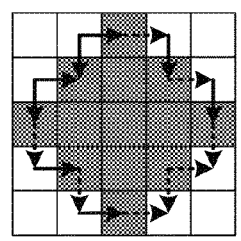
Figure 12C:
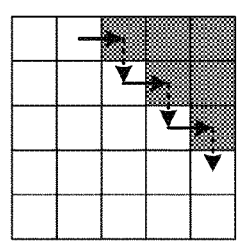
Figure 12E:
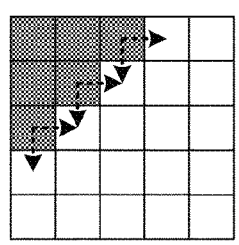

Moreover, in the E-Zone where the direction for calculating the level change amounts Mv shown in FIG. 12E (i.e., the direction from the detection data to be subtracted to the subtracting detection data) becomes an opposite direction from the area without a target object to the area where a target object exists, the number of the level change amounts with high negative values increases along the boundary between the area where a target object exists and the area without a target object. The level change amount becomes substantially 0, except for the portion along the boundary. Therefore, the total change amount ΣMv becomes a high negative value.

Thus, within the rain clutter area, the total change amount ΣMv becomes substantially 0, and the absolute value of the total change amount becomes high in the area where a target object exists. Thereby, the area of the highly-random clutter such as rain clutter and the area where a target object exists can be discriminated.

Figure 13:
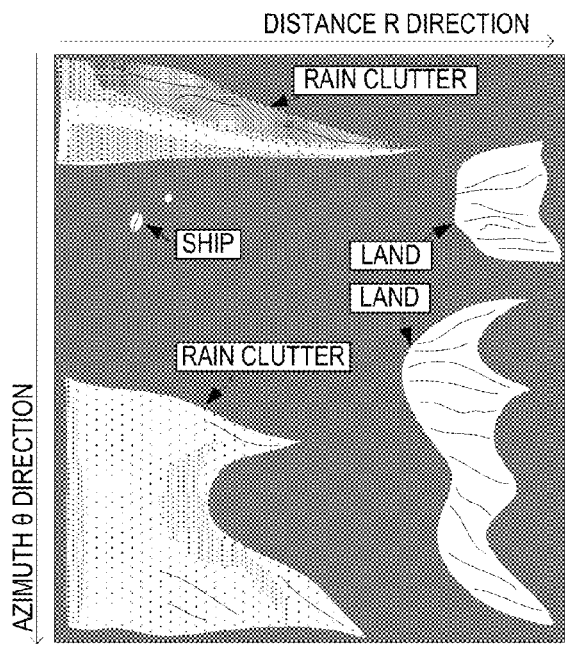
FIG. 13 is a view showing a distribution of a total change amount in a certain scan.

FIG. 13 is a view showing a distribution of the total change amounts ΣMv in a certain scan. In FIG. 13, the total change amount ΣMv is higher as the color approaches lighter color (as approaching white), and the total change amount ΣMv becomes lower as the color approaches a darker color (as approaching black). Note that FIG. 13 is created based on a distribution of the detection data value shown in FIG. 4B of the previous embodiment. As shown in FIG. 13, by using the configuration and processing of this embodiment, the total change amount ΣMv is different between the rain clutter area and the area where a target object exists, and the difference can be identified.

Meanwhile, the D-Zone within the area where a target object exists (a distant side along the distance direction rather than the B-Zone within the predetermined geographical range), the C-Zone (a near side along the distance direction rather than the E-Zone within the predetermined geographical range), and F-Zone (an area which is set so as to completely include so that the target object) as shown in FIGS. 12C, 12D, and 12F, respectively, the total change amount ΣMv becomes substantially 0, similar to the case of rain clutter. However, settings of the mask image data value of these areas may be made different from the rain clutter in the next processing.

The total change amount calculation module 35 outputs the calculated total change amount ΣMv for every polar-coordinate location to the level adjusted data calculation module 36.

The level adjusted data calculation module 36 calculates a correction value by calculating a ratio of the detection data value over the maximum value in the tone settings. That is, the level adjusted data calculation module 36 calculates the correction value by dividing the detection data value for every polar-coordinate location by the maximum value.

The level adjusted data calculation module 36 multiplies the total change amount ΣMv for every polar-coordinate location by the correction value to generate level adjusted image data.

Here, the detection data value obtained from reflection on the rain clutter usually becomes below the detection data value obtained from reflection on a target object. Therefore, the correction value of the rain clutter area becomes below the correction value of the target object existing area.

Thereby, the level adjusted image data value becomes relatively low within the rain clutter area, and the value becomes relatively high within the target object existing area.

Figure 14:
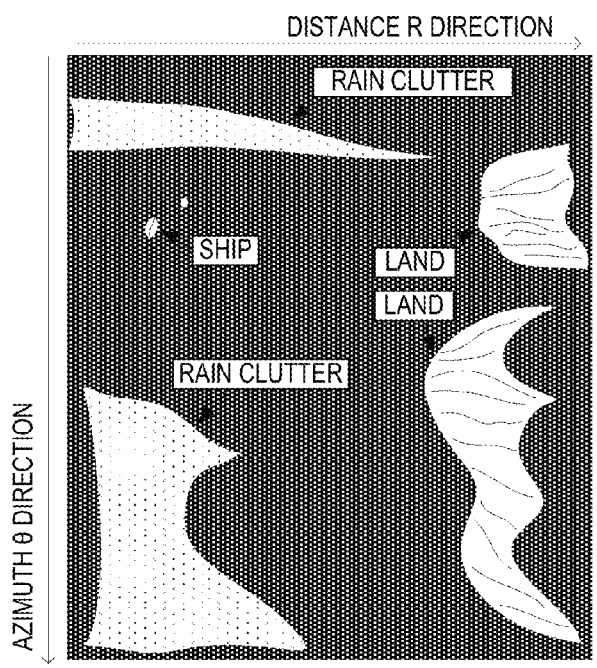
FIG. 14 is a view showing a distribution of a level adjusted image data value in a certain scan.

FIG. 14 is a view showing a distribution of the level adjusted image data values in a certain scan. In FIG. 14, the value is higher as the color approached a lighter color (as approaching white), and the value becomes lower as the color approaches a darker color (as approaching black).

As is clear from FIG. 14, by performing the processing of the level adjusted data calculation module 36, the level adjusted image data value of the rain clutter area becomes relatively low, and the level adjusted image data value of the target object existing area becomes relatively high.

Thus, by performing such processing, the level adjusted image data value can be made higher also in the area where the target object exists and the total change amount ΣMv is low, as shown in FIGS. 12C, 12D, and 12F. That is, the difference from the value of the rain clutter area can be produced.

The level adjusted data calculation module 36 outputs the level adjusted image data to the level adjusted image smoothing module 37.

The level adjusted image smoothing module 37 performs similar shading-off processing to that of the previous embodiment against the level adjusted image data. This eliminates the discontinuity which is caused between the data with a large value difference. Moreover, this processing can reduce the difference between the level adjusted image data which are produced from a relation between the location of a target object as shown in FIGS. 12A to 12F and the set location within the predetermined geographical range for calculating the total change amount ΣMv, and the level adjusted image data value can be set higher over the entire polar-coordinate location where the target object exists.

Figure 15:
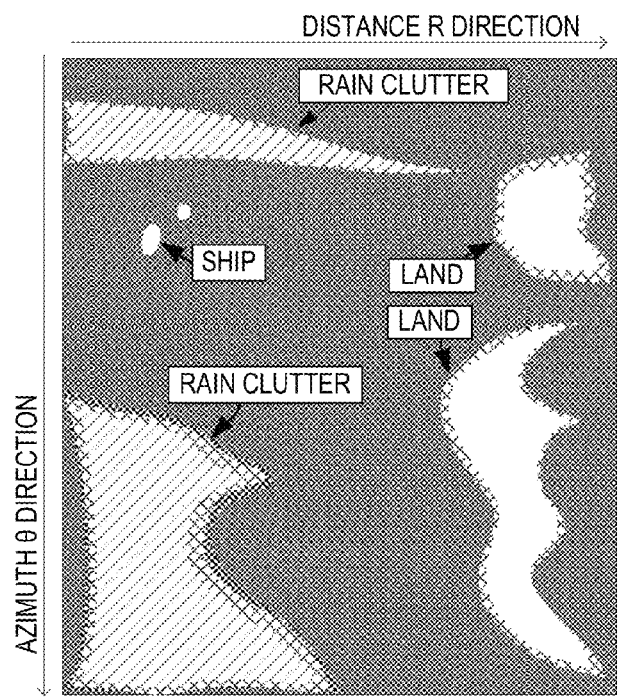
FIG. 15 is a view showing a distribution of level adjusted image data value after smoothing.

FIG. 15 is a view showing a distribution of the level adjusted image data values after the smoothing. As is clear from FIG. 15, by performing the smoothing, the change in the level adjusted image data value becomes smooth, and the level adjusted image data having a substantially uniform value within the target object existing area can be generated.

The level adjusted image smoothing module 37 outputs the level adjusted image data after the smoothing to the mask image data setting module 38.

The mask image data setting module 38 converts the level adjusted image data value after the smoothing so that the maximum value and the minimum value are reversed. Specifically, if the maximum value is 255 and the minimum value is 0, and if the data values for every polar-coordinate location before the conversion are DL, (255-DL) processing is performed. That is, the processing is to subtract the data value DL from the maximum value.

Figure 16:
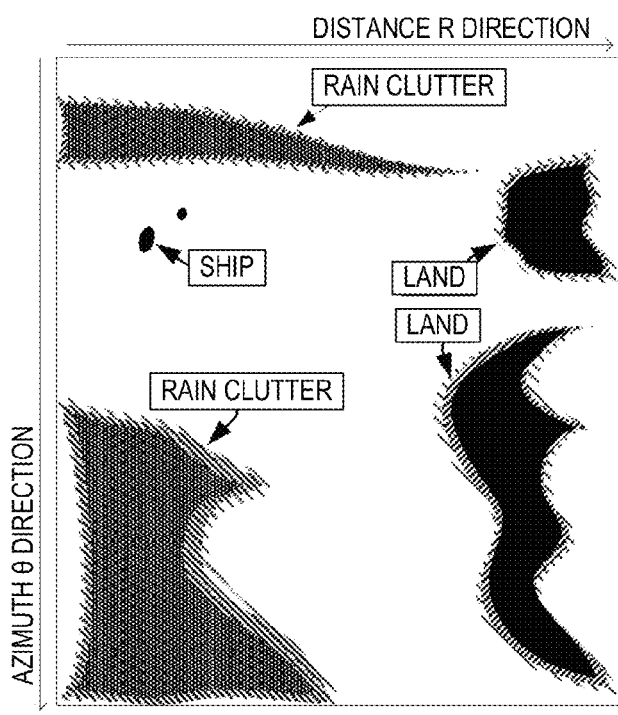
FIG. 16 is a view showing a distribution of the mask image data value formed after reversing.

FIG. 16 is a view showing a distribution of the mask image data value formed after the reversing. As is clear from FIG. 16, by performing the processing of the mask image data setting module 38, the mask image data where the data value is high within the rain clutter area and is low within the target object existing area can be set.

The mask image data setting module 38 further performs similar shading-off processing to the above to the set mask image data. By performing further shading-off processing, the mask image data with a smoother change in the data value can be set.

The mask image data set in this way is outputted to the display image formation module 15 similar to the previous embodiment according to the reading control from the display image formation module 15.

Figure 17:
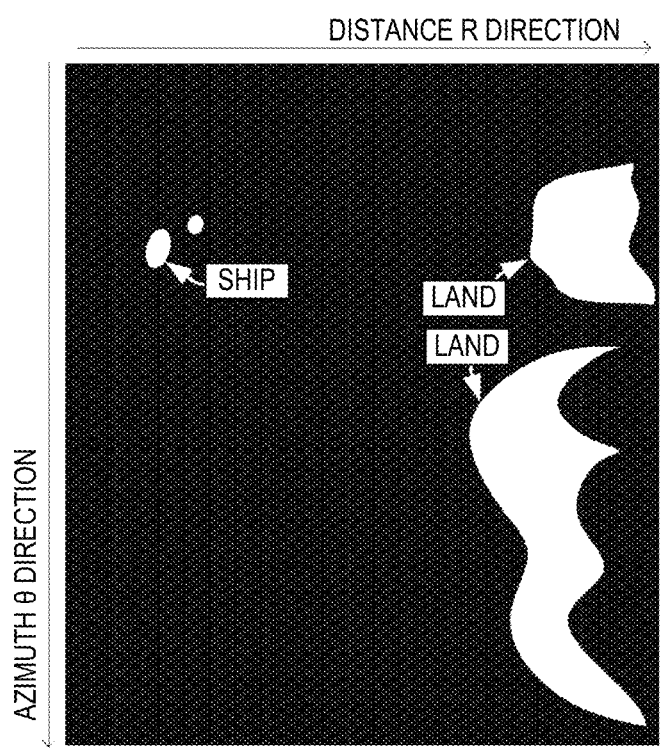
FIG. 17 shows a distribution of the display image data value when processing according to this embodiment is performed.

When such processing of this embodiment is carried out, as shown in FIG. 17, the display image data where the value remains high against a target object or land, and is suppressed within the rain clutter area can be generated. FIG. 17 shows a distribution of the display image data value when the processing of this embodiment is carried out.

Figure 18A:
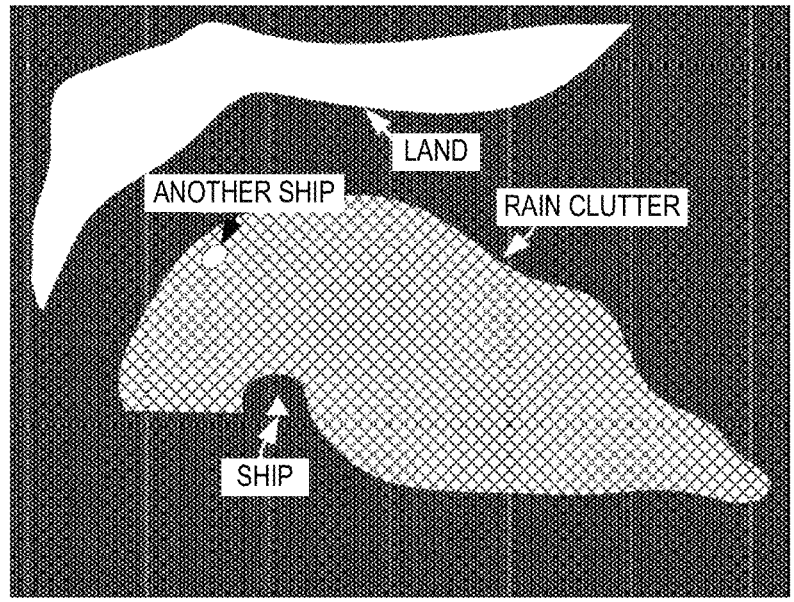
FIGS. 18A and 18B are views showing a display image in the rectangular coordinate system where the detection data are used as they are, and a display image in the rectangular coordinate system when the suppression process of this embodiment is performed, respectively.
Figure 18B:
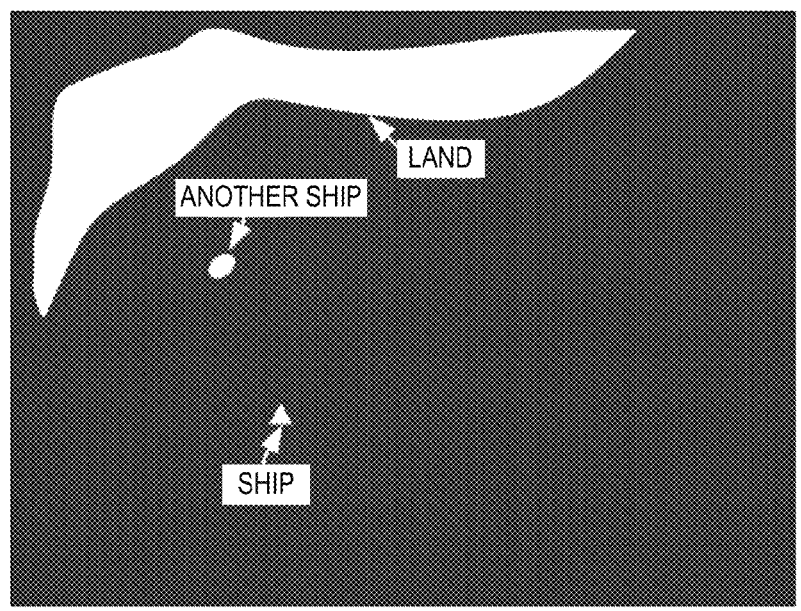

FIG. 18A shows a display image in the rectangular coordinate system where the detection data are used as they are, and FIG. 18B shows a display image in the rectangular coordinate system when the suppression of this embodiment is carried out. As is clear from FIGS. 18A and 18B, the operator can be provided with an image where the rain clutter is suppressed while leaving ship and land, by using the configuration and processing of this embodiment.

Figure 19:
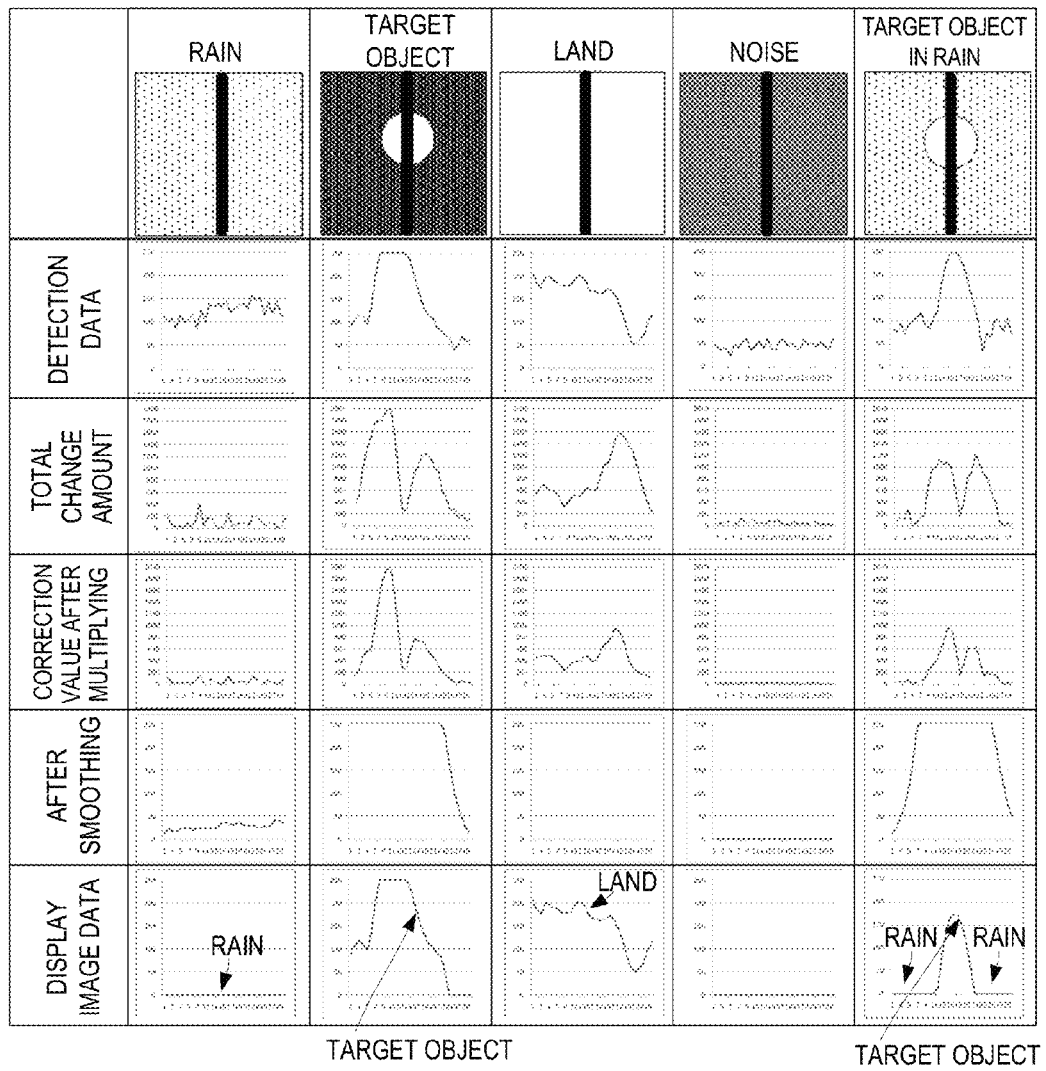
FIG. 19 shows views of transitions of the data values in respective processing of this embodiment, for rain clutter area, target object (ship), land, noise, and target object (ship) within a rain clutter area situations.

More specifically, FIG. 19 shows transitions of the data values in each process of the processing of this embodiment, for each of a rain clutter area, a target object (ship), land, noise, and the target object (ship) within the rain clutter area situations. Note that each situation shows a processing result at each polar-coordinate location along a thick line indicated in the image data in FIG. 19.

As shown in FIG. 19, the display image data values are suppressed within the rain clutter area and the noise area. The display image data values remain high for the target object (ship) and land. In the case where the target object (ship) exists within the rain clutter area, the value of the rain clutter area is suppressed while the value of the target object (ship) remains high.

Thus, by using the configuration and processing of this embodiment, target object(s), land(s) and the like can be clearly displayed, while suppressing highly-random clutter, such as rain clutter.

Figure 20:
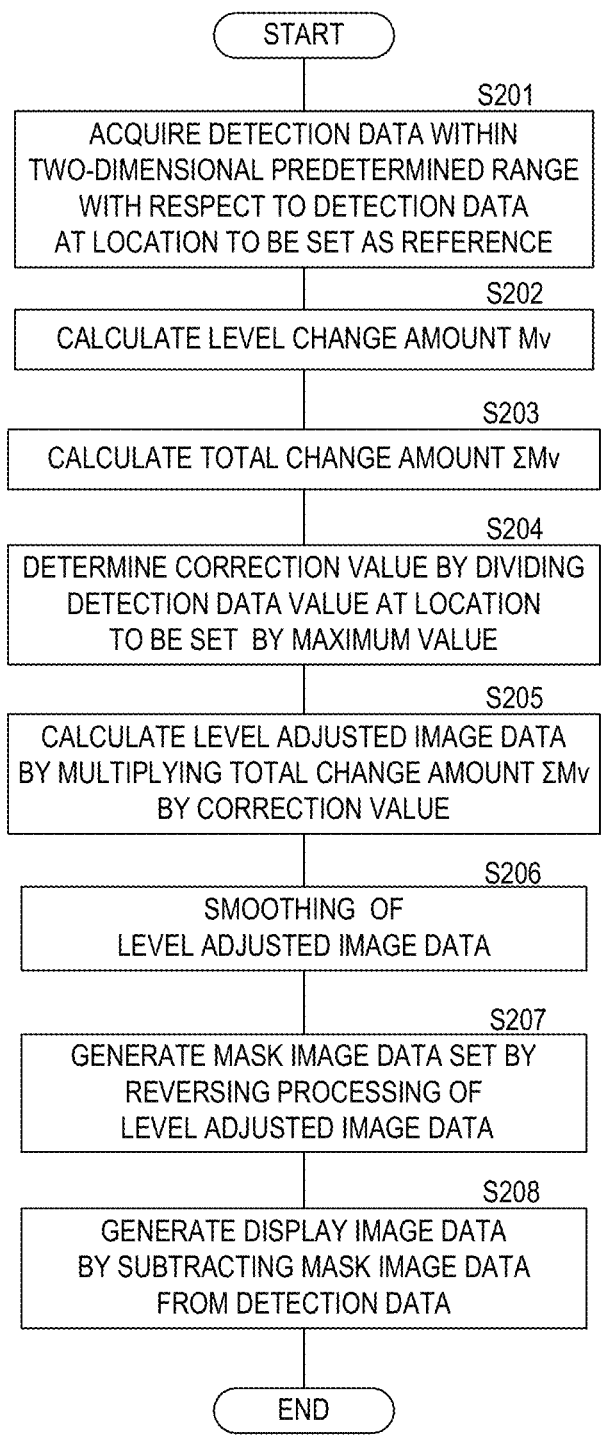
FIG. 20 is a flowchart showing suppression of the rain clutter according to this embodiment.

In this embodiment, although the entire processing is divided into functional blocks, the processing after the acquisition of the detection data of this embodiment may also be programmed as software, and stored in a storage medium to perform the program by reading out by an operating device, such as a CPU. In this case, the following process flow may be executed. Note that, since the details of each processing have been already described, main processes of the process flow are only described below. FIG. 20 is a flowchart showing the suppression of rain clutter.

First, centered on the set polar-coordinate location of the mask image data as a reference, the detection data values within the two-dimensional predetermined geographical range defined by the distance and azimuth locations (the area defined by dR and dθ in the explanation above) are acquired (S201). S201 corresponds to "temporary storing" in the claims.

Next, the level change amount Mv which is a difference between the detection data values which are adjacent in the distance direction and the azimuth direction is calculated (S202). Here, the level change amount Mv is detected along the distance direction in a given direction and along the azimuth direction in a given direction.

Next, the total change amount ΣMv which is an integrated value of the level change amounts Mv within the predetermined geographical range is calculated for every polar-coordinate location (S203). Next, the correction value is calculated by dividing the detection data value at the polar-coordinate location to be set by the maximum value (S204). Then, the level adjusted image data is calculated by multiplying the total change amount ΣMv by the correction value (S205).

Next, the smoothing of the level adjusted image data value is carried out (S206). Then, the mask image data is set by reversing the values of the level adjusted image data after the smoothing (S207). The set mask image data is further smoothened. Note that only either one of these smoothing may be performed. The processing from S202 to S207 corresponds to "generating mask image data" in the claims.

Next, the display image data is generated for every polar-coordinate location by subtracting (calculating the difference) the mask image data value after the smoothing from the detection data value (S208). S208 corresponds to "generating display image data" in the claims.

Even if such processing is carried out, the highly-random clutter, such as rain clutter, which is not to be displayed, can be effectively suppressed as described above. Then, the target object to be displayed, such as ship and land, can be displayed without being suppressed.

In the above embodiment, the radar apparatus is described as an example. However, the above configuration and method may also be applied to other devices that transmits a detection signal at a predetermined frequency to a detection area and detects a target object based on a corresponding reflection wave, such as sonar.

Moreover, in the above embodiment, the rain clutter is described as an example. However, the above method may also be applied to highly-random clutter with a large change of a reflection wave in location and time.

Moreover, in the first embodiment, the one-dimensional area (only either one of the azimuth direction or the distance direction) is set as the predetermined geographical range, however, the two-dimensional area described in the second embodiment may be set as the predetermined geographical range. On the contrary, in the second embodiment, the two-dimensional area is set as the predetermined geographical range, however, the one-dimensional area (only either one of the azimuth direction or the distance direction) described in the first embodiment may be set as the predetermined geographical range.

Moreover, in the above embodiments, the display image data is formed based on the detection data to display the detection image. However, this concept is also applicable to a radar apparatus that identifies an echo classification of the detection data.

Third Embodiment

Figure 21:
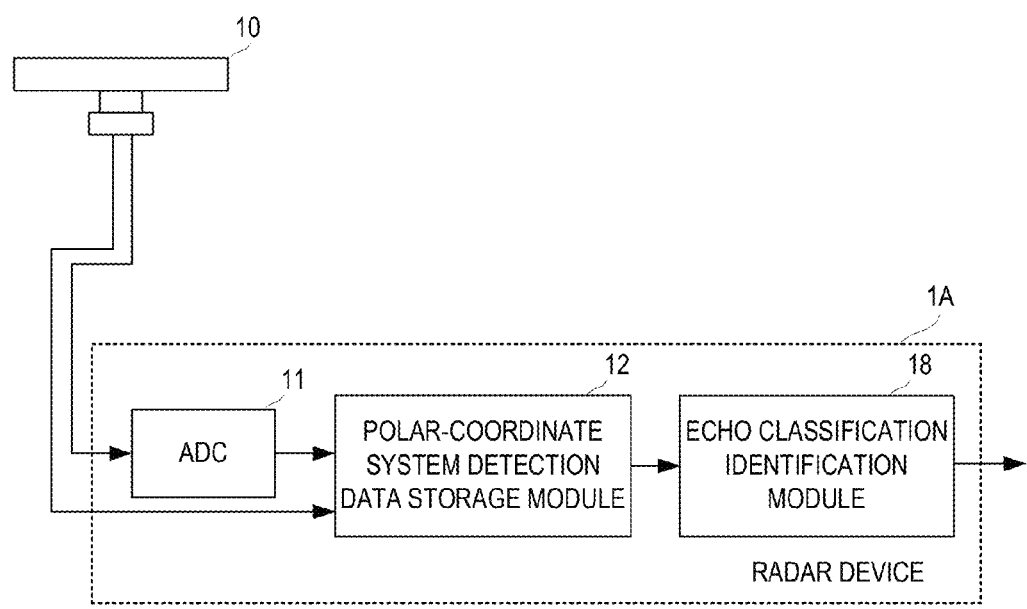
FIG. 21 is a block diagram showing a configuration of a radar apparatus that performs an echo identification, according to the third embodiment of the present invention.
Figure 22:
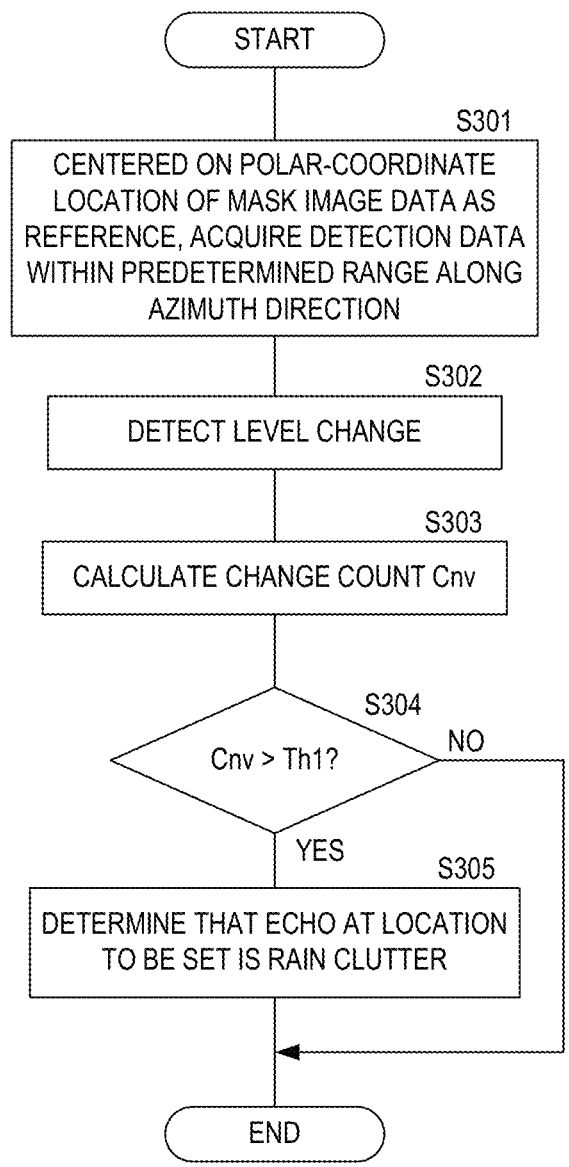
FIG. 22 is a flowchart showing a flow of the echo identification by the radar apparatus of this embodiment (using the same concept as the first embodiment)
Figure 23:
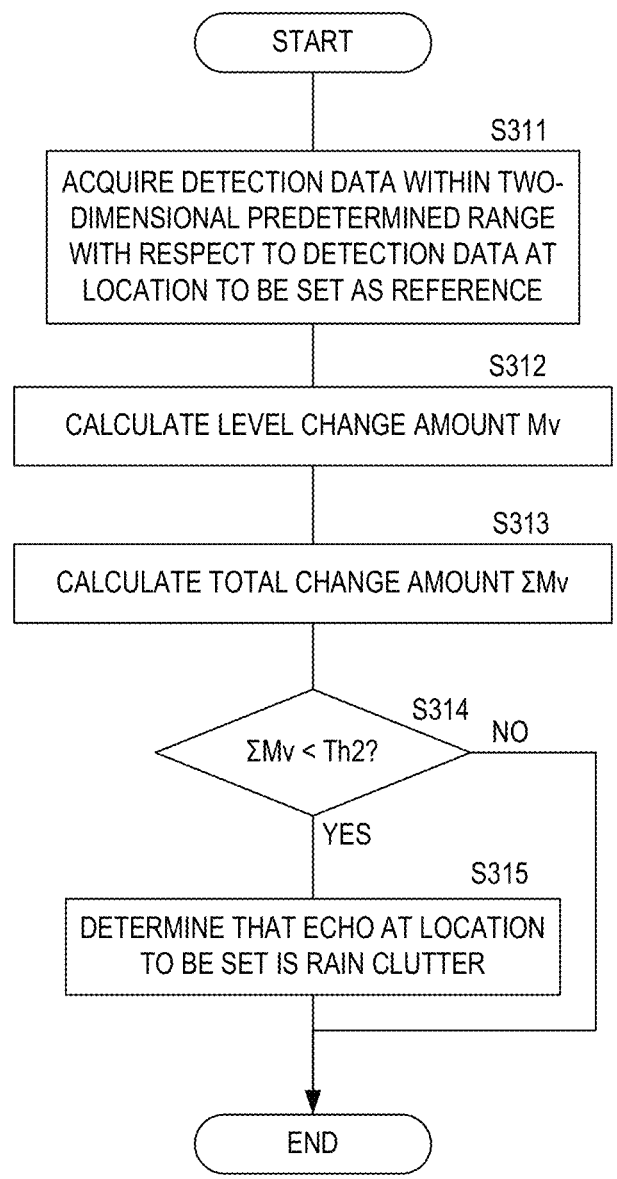
FIG. 23 is a flowchart showing another flow of the echo identification of the radar apparatus of this embodiment (using the same concept as the second embodiment).

FIG. 21 is a block diagram showing a configuration of a radar apparatus 1A according to a third embodiment that performs echo identification. FIGS. 22 and 23 are flowcharts showing flows of the echo identification performed by the radar apparatus 1A, where FIG. 22 is a case where the same concept as the first embodiment is used and FIG. 23 is a case where the same concept as the second embodiment is used.

As shown in FIG. 21, the radar apparatus 1A includes the AC-DC converter 11, the polar-coordinate detection data storage module 12, and an echo classification identification module 18. The antenna 10 is connected with the AC-DC converter 11. Since the AC-DC converter 11 and the polar-coordinate detection data storage module 12 are the same as those of the above embodiments, description thereof is omitted herein.

The echo classification identification module 18 identifies the type (classification) of an echo at an observing location by using the flows as shown in FIGS. 22 and 23.

(i) When using the change count Cnv (when processing with the same concept as the first embodiment), as shown in FIG. 22, first, centered on the set polar-coordinate location of the mask image data as a reference, the detection data values within the predetermined geographical range (dθ, described above) along the azimuth direction are acquired (S301). S301 corresponds to "temporary storing" in the claims.

Next, the difference between the detection data values which are adjacent in the azimuth direction is calculated, and any one of the level change with a positive value, the level change with a negative value, or no level change is detected (S302). Here, all the level change is detected along a given direction.

Next, it is determined whether the adjacent levels differ, and if they are different, the change count Cnv is incremented by "+1." Then, such processing is performed over the entire predetermined geographical range to calculate the change count Cnv of the set polar-coordinate location (S303).

Next, the change count Cnv is compared with threshold Th1. Here, the threshold Th1 corresponds to a "first identifying threshold" in the claims, and it is set with the same concept as the first embodiment.

If the change count Cnv is above the threshold Th1 (S304: Yes), it is determined that the echo at the set polar-coordinate location is rain clutter (S305). On the other hand, if the change count Cnv is below the threshold Th1 (S304: No), it is determined that the echo is not rain clutter. The processing from S302 to S305 corresponds to "echo identification" in the claims.

Such processing is performed over all the polar-coordinate locations for one scan to discriminate the kind of echo at each location for one scan.

(ii) When using the total change amount ΣMv (when processing with the same concept as the second embodiment), as shown in FIG. 23, first, centered on the set polar-coordinate location of the mask image data as a reference, the detection data values within the two-dimensional predetermined geographical range defined by the distance location and the azimuth location (the area defined by dR and dθ in the explanation above) are acquired (S311). S311 corresponds to "temporary storing" in the claims.

Next, the level change amount Mv which is the difference between the detection data values which are adjacent in the distance direction and the azimuth direction is calculated (S312). Here, the level change amount Mv is detected along the distance direction in a given direction and along the azimuth direction in a given direction.

Next, the total change amount ΣMv which is an integrated value of the level change amounts Mv within the predetermined geographical range is calculated for every polar-coordinate location (S313).

Next, the total change amount ΣMv is compared with threshold Th2. Here, the threshold Th2 corresponds to "second identifying threshold" in the claims, and it is set with the same concept as the second embodiment. If the total change amount ΣMv is below the threshold Th2 (S314: Yes), it is determined that the echo at the polar-coordinate location to be set is rain clutter (S315). On the other hand, if the total change amount ΣMv is above the threshold Th2 (S314: No), it is determined that the echo is not rain clutter. The processing from S312 to S315 corresponds to "generating mask image data" in the claims.

Such processing is performed over all the total polar-coordinate locations for one scan to discriminate the type of echo at each location for one scan.

In this embodiment, the rain clutter and other echoes are discriminated, a highly-random echo containing noise and rain clutter may also be discriminated.

Then, the result identified in this way is applicable to a formation of the display image data as described in the above embodiments.

Moreover, by detecting the location of the highly-random echo, an echo with a large amplitude value can be determined to be an echo of a target object except for the location concerned, and it can also be used for the target object detection. In addition, because the ability of target object detection is provided, by combining with such systems as ARPA, tracking of target object (other ships, etc.) can be reliably performed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is designed in at least that way, but may also be configured in ways that are not listed.

What is claimed is:

1. A method of detecting a target object by receiving reflection echoes of detection signals transmitted sequentially from a revolving antenna, and by detecting a target object based on detection data resulted from sampling reception signals at a predetermined time interval, the method comprising:
    temporarily storing the detection data within a predetermined geographical range; and
    identifying the type of the reflection echo based on a change between values of the detection data at physically-close locations within the predetermined geographical range.

2. The method of claim 1, wherein the step of identifying the type of the reflection echo comprises:
    counting the number of times of the change in the detection data values within the predetermined geographical range, the change being from a positive value to a negative value or from a negative value to a positive value; and
    determining that the type of the reflection echo is rain clutter or noise if the counted value is above a first identifying threshold.

3. The method of claim 1, wherein the step of identifying the type of the reflection echo comprises:
    calculating a total amount of the change by adding amounts of the changes in the detection data value within the predetermined geographical range; and
    determining that the type of the reflection echo is rain clutter or noise if the total amount of the change is below a second identifying threshold.

4. The method of claim 2, further comprising:
    generating mask image data for suppressing the rain clutter or the noise based on the determination of the type of the reflection echo; and
    generating display image data using the detection data and the mask image data.

5. The method of claim 3, further comprising:
    generating mask image data for suppressing the rain clutter or the noise based on the determination of the type of the reflection echo; and
    generating display image data using the detection data and the mask image data.

6. A method of detecting a target object by receiving reflection echoes of detection signals transmitted sequentially from a revolving antenna and by generating display image data of detected target object based on detection data resulted from sampling reception signals at a predetermined time interval, the method comprising:
    temporarily storing the detection data within a predetermined geographical range;

generating mask image data based on a change between values of the detection data at physically-close locations within a predetermined geographical range; and
generating the display image data using the detection data and the mask image data.

7. The method of claim 6, wherein the step of generating mask image data comprises:
counting the number of times of the change in the detection data value within the predetermined geographical range, the change being from a positive value to a negative value or from a negative value to a positive value; and
setting a value of the mask image data to a predetermined mask image value if the counted value is above a threshold,
wherein the generating display image data comprises subtracting the mask image data value from the detection data value.

8. The method of claim 6, wherein the step of generating mask image data comprises:
calculating a total amount of the change by adding amounts of the changes in the detection data value within the predetermined geographical range;
setting an original data value of the mask image data, according to the total amount of the change; and
setting a new value of the mask image data by subtracting the original data value from a maximum settable value of the mask image data value,
wherein the step of generating display image data comprises subtracting the mask image data value from the detection data value.

9. The method of claim 8, wherein the step of generating mask image data comprises:
calculating a correction value, obtained by dividing the detection data value by the maximum settable value; and
setting a value obtained by multiplying the total change amount by the correction value to the original data value.

10. The method of claim 8, wherein the step of generating mask image data comprises smoothing a distribution of the original data value.

11. A device for detecting a target object by receiving reflection echoes of detection signals transmitted sequentially from a revolving antenna, and by detecting a target object based on detection data resulted from sampling reception signals at a predetermined time interval, the device comprising:
a temporarily storage module for temporarily storing the detection data within a predetermined geographical range; and
an echo identification module for identifying the type of the reflection echo based on a change between values of the detection data at physically-close locations within the predetermined geographical range.

12. The device of claim 11, wherein the echo identification module counts the number of times of the change in the detection data value within the predetermined geographical range, the change being from a positive value to a negative value or from a negative value to a positive value, and
the echo identification module determines that the type of the reflection echo is rain clutter or noise if the counted value is above a first identifying threshold.

13. The device of claim 11, wherein the echo identification module calculates a total amount of the change by adding amounts of the changes in the detection data value within the predetermined geographical range, and
the echo identification module determines that the type of the reflection echo is rain clutter or noise if the total amount of the change is below a second identifying threshold.

14. The device of claim 12, further comprising:
a mask image data generation module for generating mask image data for suppressing the rain clutter or the noise based on the determination of the type of the reflection echo; and
a display image data generation module for generating display image data using the detection data and the mask image data.

15. The device of claim 13, further comprising:
a mask image data generation module for generating mask image data for suppressing the rain clutter or the noise based on the determination of the type of the reflection echo; and
a display image data generation module for generating display image data using the detection data and the mask image data.

16. A device for detecting a target object by receiving reflection echoes of detection signals transmitted sequentially from a revolving antenna and by generating display image data of detected target object based on detection data resulted from sampling reception signals at a predetermined time interval, the device comprising:
a temporarily storage module for temporarily storing the detection data within a predetermined geographical range;
a mask image data generation module for generating mask image data based on a change between values of the detection data at physically-close locations within a predetermined geographical range; and
a display image data generation module for generating the display image data using the detection data and the mask image data.

17. The device of claim 16, wherein the mask image data generation module counts the number of times of the change in the detection data value within the predetermined geographical range, the change being from a positive value to a negative value or from a negative value to a positive value, and
the mask image data generation module sets a value of the mask image data to a predetermined mask image value if the counted value is above a threshold,
wherein the display image data generation module subtracts the mask image data value from the detection data value.

18. The device of claim 16, wherein the mask image data generation module calculates a total amount of the change by adding amounts of the changes in the detection data value within the predetermined geographical range,
the mask image data generation module sets an original data value of the mask image data, according to the total amount of the change, and
the mask image data generation module sets a new value of the mask image data, by subtracting the original data value from a maximum settable value of the mask image data value,
wherein the display image data generation module subtracts the mask image data value from the detection data value.

19. A radar apparatus comprising the device of claim 11, wherein electromagnetic waves at a predetermined frequency are used as the detection signals.

20. A radar apparatus comprising the device of claim 16, wherein electromagnetic waves at a predetermined frequency are used as the detection signals.

\* \* \* \* \*